United States Patent
Narita et al.

(10) Patent No.: US 9,645,704 B2
(45) Date of Patent: May 9, 2017

(54) INFORMATION PROCESSING APPARATUS, INFORMATION PROCESSING METHOD AND PROGRAM

(75) Inventors: Tomoya Narita, Kanagawa (JP); Ritsuko Kano, Tokyo (JP); Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 624 days.

(21) Appl. No.: 13/220,078

(22) Filed: Aug. 29, 2011

(65) Prior Publication Data

US 2012/0069043 A1    Mar. 22, 2012

(30) Foreign Application Priority Data

Sep. 7, 2010    (JP) ................ P2010-200151

(51) Int. Cl.
| | | |
|---|---|---|
| G09G 5/00 | (2006.01) | |
| G06F 3/0482 | (2013.01) | |
| G06F 3/0485 | (2013.01) | |
| G06F 3/0488 | (2013.01) | |

(52) U.S. Cl.
CPC .......... G06F 3/0482 (2013.01); G06F 3/0485 (2013.01); G06F 3/04886 (2013.01)

(58) Field of Classification Search
CPC ...................................................... G06F 3/0488
USPC ................................................. 345/173, 589
See application file for complete search history.

(56) References Cited

U.S. PATENT DOCUMENTS

| | | | |
|---|---|---|---|
| 2005/0134751 A1* | 6/2005 | Abileah et al. | 349/42 |
| 2006/0026521 A1* | 2/2006 | Hotelling | G06F 3/0418 |
| | | | 715/702 |
| 2007/0252821 A1* | 11/2007 | Hollemans et al. | 345/173 |
| 2008/0100593 A1* | 5/2008 | Skillman et al. | 345/175 |
| 2008/0122796 A1* | 5/2008 | Jobs et al. | 345/173 |
| 2008/0259053 A1* | 10/2008 | Newton | 345/175 |
| 2009/0160791 A1* | 6/2009 | Lieberman | 345/173 |
| 2009/0256947 A1* | 10/2009 | Ciurea et al. | 348/333.12 |
| 2010/0026723 A1* | 2/2010 | Nishihara et al. | 345/671 |
| 2010/0091110 A1* | 4/2010 | Hildreth | G06F 3/011 |
| | | | 348/169 |
| 2010/0156818 A1* | 6/2010 | Burrough | G06F 3/016 |
| | | | 345/173 |
| 2011/0037712 A1* | 2/2011 | Kim et al. | 345/173 |
| 2011/0037714 A1* | 2/2011 | Seo | G06F 3/0482 |
| | | | 345/173 |
| 2012/0036479 A1* | 2/2012 | Kasahara et al. | 715/825 |

FOREIGN PATENT DOCUMENTS

JP    11-316635    11/1999

* cited by examiner

*Primary Examiner* — Phi Hoang
(74) *Attorney, Agent, or Firm* — Chip Law Group

(57) ABSTRACT

An method is provided for controlling devices. The method comprises detecting location of an operating member in non-contacting proximity to a non-contacting interface. The method further comprises changing selection among a plurality of data objects belonging to a group, based on a change in detected location of the operating member while in proximity to the interface.

19 Claims, 6 Drawing Sheets

INFORMATION PROCESSING APPARATUS, INFORMATION PROCESSING METHOD AND PROGRAM

BACKGROUND

The present disclosure relates to an information processing apparatus, an information processing method and a computer-readable storage device.

While a photograph set or the like obtained by successive shooting is likely to include a great number of photographs, the difference between the photographs is little. Therefore, if it is tried to apply a method same as a method for managing a single photograph to management of a photograph set or the like, then the efficiency in operation for management is low because similar photographs are involved successively. In recent years, in order to solve this problem, photographs are managed, for example, using a hierarchical structure. According to this method, if an operation to select one of successively shot grouped photographs grouped in a hierarchy same as that of a single photograph is carried out, then it is possible to carry out an operation later so that a mode in which a photograph in the group can be selected can be entered.

What are grouped are not limited to images of a photograph set or the like. For example, a technique is known that a plurality of functions are grouped into a plurality of function groups, and when an operation button is depressed, a different function in the same hierarchy is selected, but, when the operation button is depressed twice, functions in the lower hierarchy are rendered selectable. The technique is disclosed, for example, in Japanese Patent Laid-Open No. Hei 11-316635.

SUMMARY

However, such a technique as described above has a problem that an operation is complicated since an operation for changing over the mode between a mode in which a target of selection is changed over between different groups by a predetermined operation and another mode in which a target of selection is changed over within a group is required. For example, in the case where an image is a target of selection, an operation for changing over the mode between a mode in which an image is changed over between groups (the mode is hereinafter referred to as "normal image feeding mode") and another mode in which an image is changed over within a group (the mode is hereinafter referred to as "intra-group image feeding mode) is required. Therefore, in such a case that normal image feeding and intra-group image feeding are carried out alternately to browse images comprehensively, it is necessary to carry out a changing operation between different hierarchies, and the operation becomes cumbersome.

Therefore, it is desirable to provide a novel and improved information processing apparatus, information processing method and program by which an operation for changing over the mode between a mode in which a selection target is changed over between different groups and another mode in which a selection target is changed over within a group can be implemented simply and intuitively.

Accordingly, there is provided an apparatus for controlling devices. The apparatus includes a detecting unit for detecting location of an operating member in non contacting proximity to a non-contacting interface. The apparatus further includes a changing unit for changing selection among a plurality of data objects belonging to a group, based on a change in detected location of the operating member while in proximity to the interface.

In another aspect, there is provided a method for controlling devices. The method includes detecting location of an operating member in non-contacting proximity to a non-contacting interface. The method further includes changing selection among a plurality of data objects belonging to a group, based on a change in detected location of the operating member while in proximity to the interface.

In another aspect, there is provided a tangibly-embodied non-transitory computer-readable storage device storing instructions which, when executed by a processor, cause a computer to perform a method controlling devices. The method includes detecting location of an operating member in non-contacting proximity to a non-contacting interface. The method further includes changing selection among a plurality of data objects belonging to a group, based on a change in detected location of the operating member while in proximity to the interface.

According to the embodiments described above, there are provided an information processing apparatus, information processing method, and computer-readable storage device. Some embodiments may readily provide an operation for changing over between the mode in which the selection target is changed over between groups and the mode in which the selection target is changed over within a group in a simple and intuitive manner.

DETAILED DESCRIPTION OF THE PREFERRED EMBODIMENT

Figure 1:
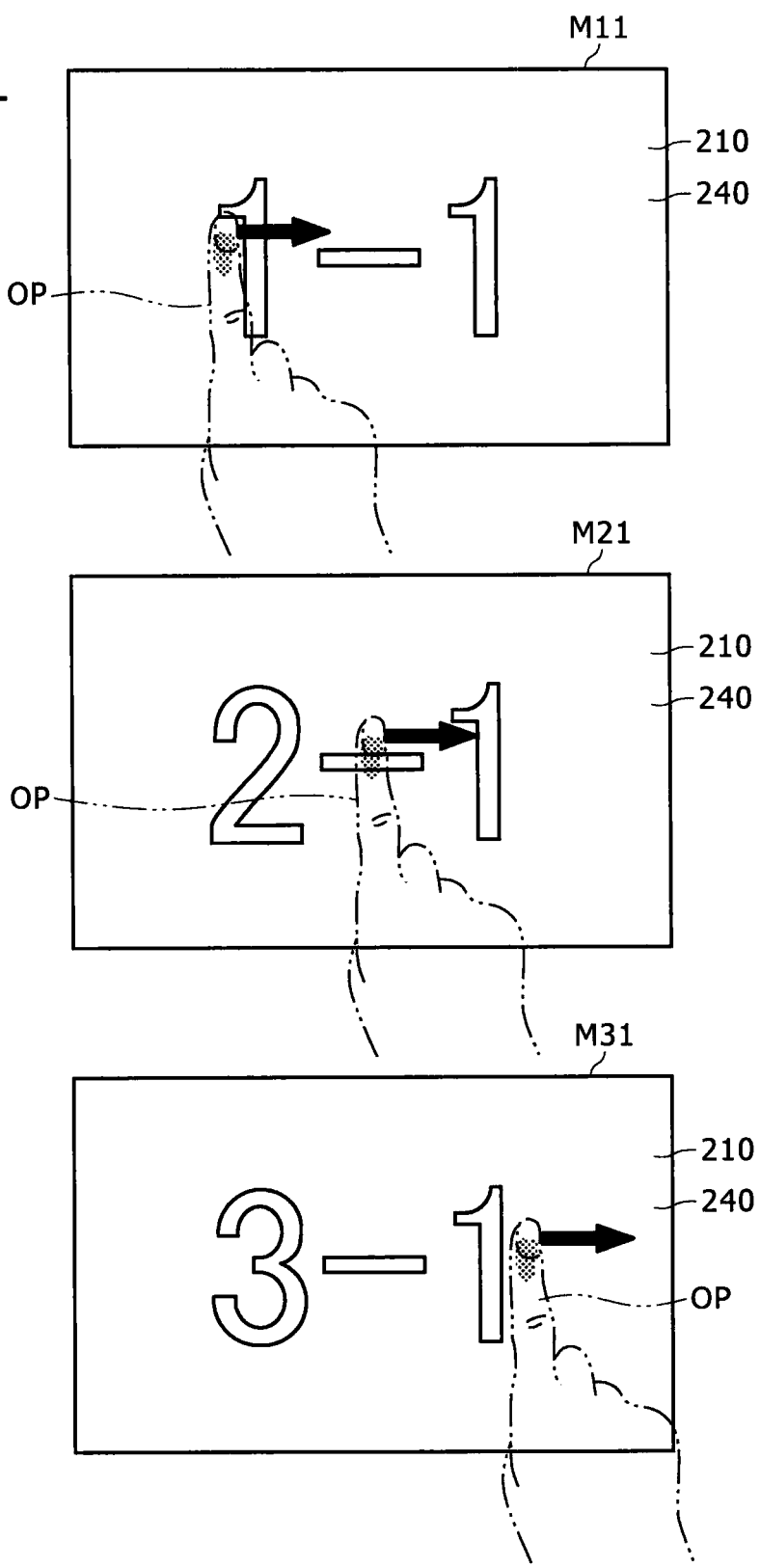
FIG. 1 is a schematic view illustrating changeover of a display target between different groups carried out by an information processing apparatus according to an embodiment.

In the following, an embodiment of the present disclosure is described in detail with reference to the accompanying drawings. It is to be noted that, in the specification and the accompanying drawings, substantially like parts or elements having substantially like functional configurations are denoted by like reference characters, and overlapping description of the same is omitted herein to avoid redundancy.

It is to be noted that the description is given in the following order:
1. Embodiment
   1-1. Changeover of a display target between groups
   1-2. Changeover of a display target within a group
   1-3. Changeover of a selection target between groups or within a group
   1-4. Functional configuration of the information processing apparatus
   1-5. Hardware configuration of the information processing apparatus
   1-6. Flow of processing executed by the information processing apparatus
   1-7. Flow of processing executed when a touching operation is carried out
   1-8. Flow of processing executed when a proximity operation is carried out
2. Modifications
3. Summary 1. First Embodiment 1-1. Changeover of a Display Target Between Groups FIG. 1 illustrates changeover of a display target between groups carried out by an information processing apparatus according to an embodiment. Referring to FIG. 1, the information processing apparatus according to the present embodiment carries out changeover of a display target between groups if it detects an operation of moving an operating body OP, also called an operating member, while it is kept in contact with an informational panel device, such as non-contacting interface 210 (the operation is hereinafter referred to also as "touch drag operation").

In the example shown in FIG. 1, images including characters "1-1," "1-2" and "1-3" belong to a first group; images including characters "2-1," "2-2" and "2-3" belong to a second group; and images including characters "3-1," "3-2" and "3-3" belong to a third group. The information processing apparatus first displays an image M11 including the character "1-1" and belonging to the first group on a display device 240. If, in this state, the information processing apparatus detects a touch drag operation in a rightward direction which is an example of a predetermined direction, then it changes over the display target to an image M21 which includes the character "2-1" and belongs to the second group which corresponds to a next group to the first group. As a result of the changeover, the information processing apparatus causes the image M21 to be displayed on the display device 240.

Further, if, in this state, the information processing apparatus detects a touch drag operation in the rightward direction, then it changes over the display target to an image M31 which includes the character "3-1" and belongs to the third group which corresponds to a next group to the second group. As a result of the changeover, the information processing apparatus causes the image M31 to be displayed on the display device 240.

Further, if the information processing apparatus detects, in the state in which the image M11 which includes the character "1-1" and belongs to the first group is displayed on the display device 240, a touch drag operation in a leftward direction corresponding to the opposite direction to the predetermined direction described hereinabove, then the information processing apparatus may change over the display target to the image M31 which includes the character "3-1" and belongs to the third group which corresponds, for example, to a group preceding to the first group. As a result of the changeover, the information processing apparatus causes the image M31 to be displayed on the display device 240.

What are grouped are not particularly limited if they can be displayed by the display device 240. However, it is estimated that a set or group of photographs, for example, successively shot photographs, panorama photographs or 3D photographs may be grouped so as to belong to one group.

Moreover, as can be seen in FIG. 1, functions of both non-contacting interface 210 and functions of a display device 240 may be performed by a unitary display device, such as by a single informational panel device. However, it is to be appreciated that the functions of non-contacting interface 210 and display device 240 may be performed by separate devices.

1-2. Changeover of a Display Target within a Group

Figure 2:
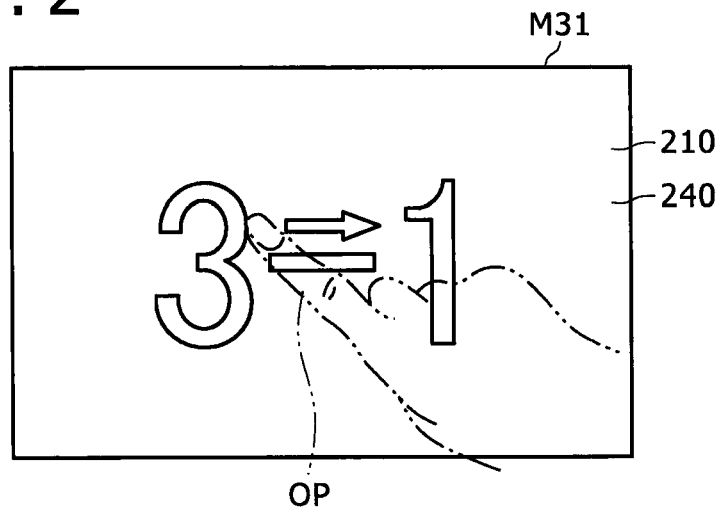
FIG. 2 is a similar view but illustrating changeover of a display target within a group carried out by the information processing apparatus.
Figure 2:
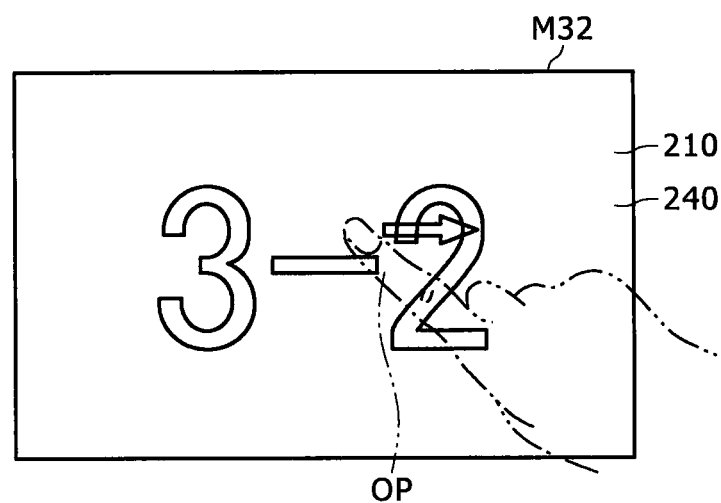
Figure 2:
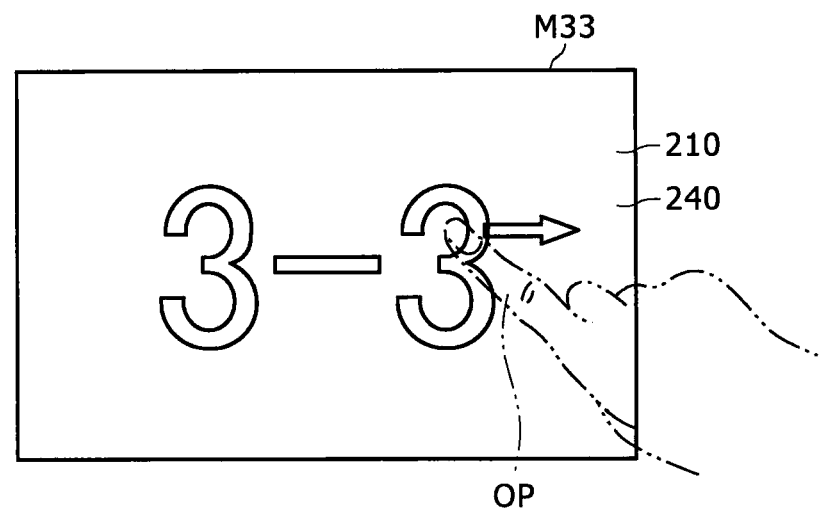

FIG. 2 illustrates changeover of a display target within a group carried out by the information processing apparatus according to the embodiment. Referring to FIG. 2, the information processing apparatus according to the present embodiment carries out changeover of a display target within a group if it detects an operation of moving the operating body OP while it is kept in non-contacting proximity of the non-contacting interface 210 (the operation is hereinafter referred to also as "proximity drag operation").

In the example illustrated in FIG. 2, the information processing apparatus first displays the image M31 including the character "3-1" and belonging to the third group on the display device 240, for example, by such a method as described hereinabove with reference to FIG. 1. If, in this state, the information processing apparatus detects, via a detecting unit, a proximity drag operation in the rightward direction which is an example of the predetermined direction, then a changing unit of the information processing apparatus changes over the display target to an image M32 which includes the character "3-2" and corresponds to a next image to the image M31 in the third group, based on the detected movement of the proximity drag operation. As a result of the changeover, the information processing apparatus causes the image M32 to be displayed on the display device 240.

Further, if, in this state, the information processing apparatus detects a proximity drag operation in the rightward direction, then it changes over the display target to an image M33 which corresponds to a next image to the image M32 in the third group. As a result of the changeover, the information processing apparatus causes the image M33 to be displayed on the display device 240.

If the information processing apparatus detects, in the state in which the image M31 which includes the character "3-1" and belongs to the third group is displayed on the display device 240, a proximity drag operation in the leftward direction corresponding to the opposite direction to the predetermined direction described hereinabove, then the information processing apparatus may change over the display target to the image M33 which corresponds, for example, to an image preceding to the image M31 in the third group. As a result of the changeover, the information processing apparatus causes the image M33 to be displayed on the display device 240.

In this manner, only by moving the operating body OP away from the non-contacting interface 210 from the state illustrated in FIG. 1, it is possible to carry out such operations as described above with reference to FIG. 2. Further, by placing the operating body OP into touch with the non-contacting interface 210, an operation in regard to a greater unit can be carried out, and by placing the operating body OP in the proximity of the non-contacting interface 210, an operation in regard to a smaller unit in the large unit can be carried out. Therefore, an operation for changing over the mode between the mode in which the selection target is changed over between groups and the mode in which the selection target is change over within a group can be implemented simply, easily and intuitively.

Generally, according to a proximity operation, since an operation state is liable to change, a malfunction is frequently detected inadvertently. Since it is considered that images which belong to the same group have a high relevancy to each other, by limiting the proximity operation to an operation within the same group, even if the operation is wrong, the screen condition does not vary significantly. Therefore, such a situation that the user loses the situation is less likely to occur.

1-3. Changeover of a Selection Target Between Groups or within a Group

Figure 3:
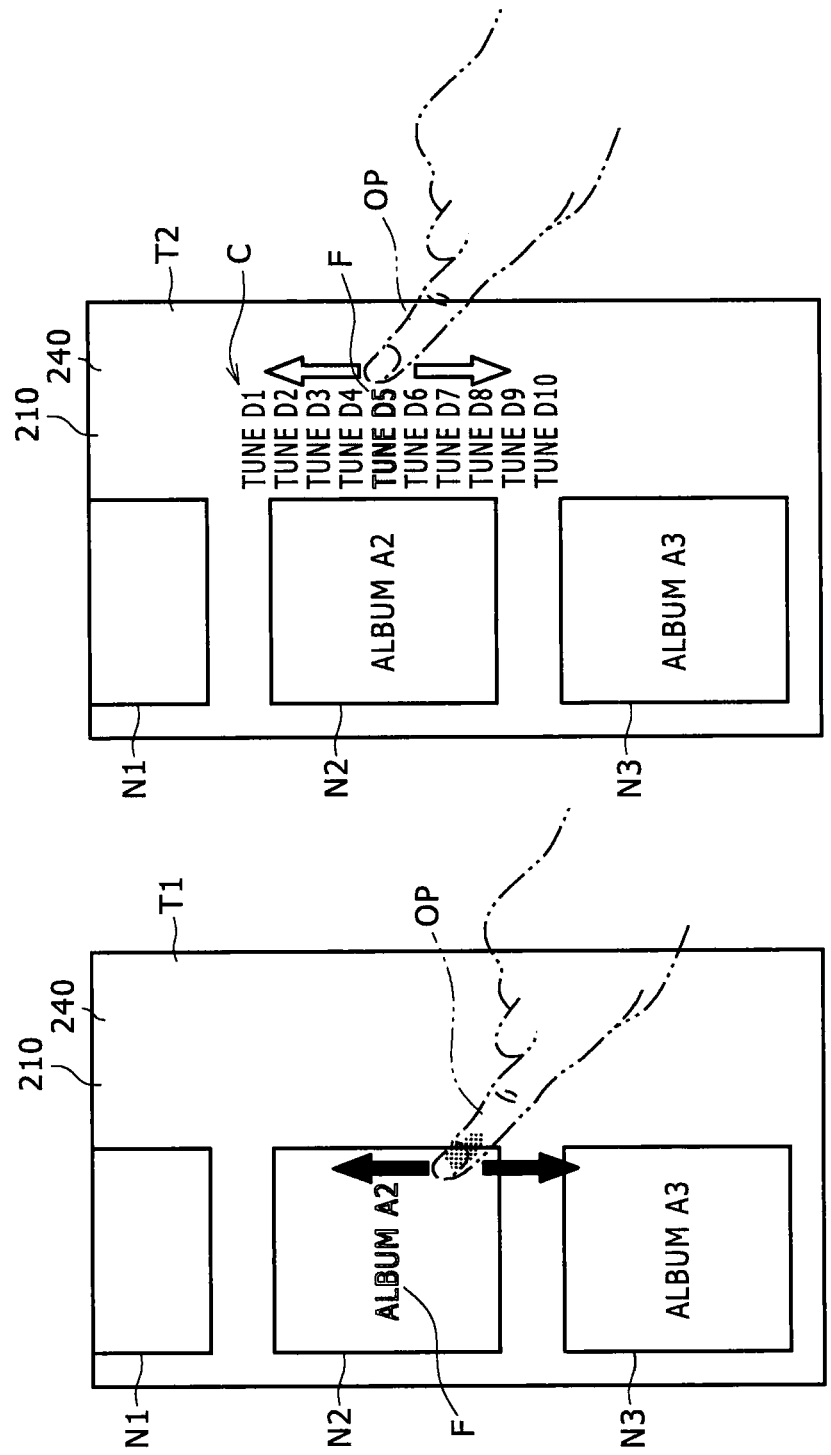
FIG. 3 is a schematic view illustrating changeover of a selection target between different groups or within a group carried out by the information processing apparatus.

FIG. 3 illustrates changeover of the selection target between groups or within a group carried out by the information processing apparatus of the embodiment. Referring to FIG. 3, the information processing apparatus carries out changeover of the selection target between groups if it detects a touch drag operation.

In the example illustrated in FIG. 3, the information processing apparatus displays a screen image T1 on the display device 240. The screen image T1 includes an image N2 including a character of "Album A2," another image N3 including a character of "Album A3" and part of a further image N1 including a character of "Album A1." The "Album A1" corresponds to a first group; the "Album A2" corresponds to a second group; and the "Album A3" corresponds to a third group.

Further, in the example illustrated in FIG. 3, a first tune which belongs to the "Album A2" is selected. The image N2 including the character of "Album 2" may be indicated by a focus F, i.e., a highlighting. The focus F is displayed in order to emphasize the selected tune in comparison with the unselected tunes. Here, while it is assumed that the selected tune is reproduced by the information processing apparatus of the embodiment, information relating to the selected tune may be displayed on the display device 240 by the information processing apparatus.

If, in this state, the information processing apparatus detects a touch drag operation in a downward direction which is an example of the predetermined direction, then the information processing apparatus changes over the selection target to a first tune which belongs to the "Album A3" which corresponds to a group next to the group of the "Album A2." As a result of the changeover, the information processing apparatus selects the first tune which belongs to the "Album A3."

On the other hand, if, in the state in which the first tune belonging to the "Album A2" is selected, the information processing apparatus detects a touch drag operation in an upward direction which corresponds to the opposite direction to the predetermined direction, then it may change over the selection target to a first tune belonging to the "Album A1" which corresponds to the group preceding to the "Album A2." As a result of the changeover, the information processing apparatus selects the first tune belonging to the "Album A1."

If, in the state in which the first tune belonging to the "Album A2" is selected, the information processing apparatus detects that the operating body OP is positioned in non-contacting proximity of the non-contacting interface 210, then it displays a screen image T2 on the display device 240. If the information processing apparatus detects a proximity drag operation, then it carries out changeover of the selection target within a group.

First, if the information processing apparatus detects a proximity drag operation in the rightward direction which is an example of the predetermined direction, then it changes over the selection target to a tune D2 next to the selected tune D1 in the "Album A2" to which the selected tune belongs. As a result of the changeover, the information processing apparatus selects the tune D2.

Further, if, in this state, the information processing apparatus detects a proximity drag operation in the downward direction which is an example of the predetermined direction, then it changes over the selection target to the tune D2 which is next to the tune D1 in the "Album A2." As a result of the changeover, the information processing apparatus selects the tune D2.

If, in the state in which the tune D1 belonging to the "Album A2" is selected, the information processing apparatus detects a proximity drag operation in the upward direction which corresponds to the opposite direction to the predetermined direction, then it may change over the selection target, for example, to a tune D10 preceding to the tune D1 in the "Album A2." As a result of the changeover, the information processing apparatus selects the tune D10.

While, in the example described above, a tune is selected by a touch drag operation or a proximity drag operation, the tune may otherwise be selected by a touch operation with the non-contacting interface 210 which is carried out after the touch drag operation or the proximity drag operation. In the example illustrated in FIG. 3, a fifth tune D5 belonging to the "Album A2" is selected. A focus F may be applied to a character C corresponding to the selected tune D5.

1-4. Functional Configuration of the Information Processing Apparatus

Figure 4:
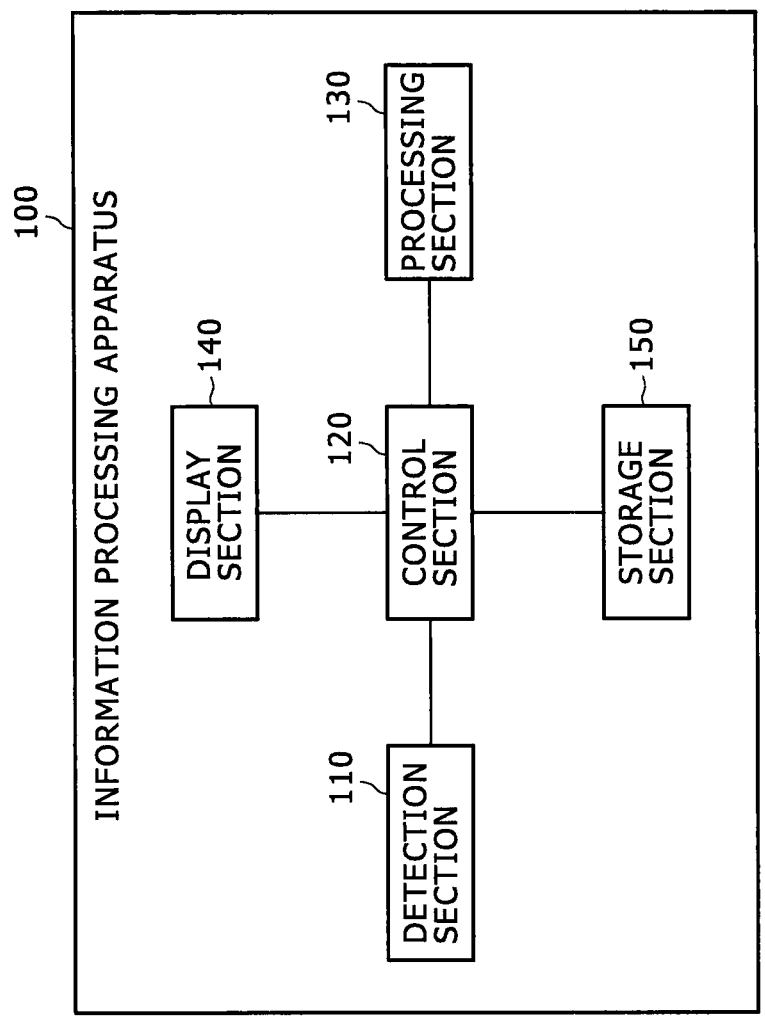
FIG. 4 is a block diagram showing a functional configuration of the information processing apparatus.

FIG. 4 shows a functional configuration of the information processing apparatus of the present embodiment. Referring to FIG. 4, the information processing apparatus 100 shown includes a detection section 110 (i.e., a detecting unit) and a control section 120 (i.e., a changing unit).

The detection section 110 includes a non-contacting interface 210 (FIG. 5) and has a function of detecting a proximity operation by the operating body OP, i.e., detecting a location of the operating body OP. The proximity operation by the operating body OP may be, for example, a proximity drag operation. Information of the movement of the operating body OP in the case where a proximity operation is carried out may be information from which it can be grasped that the operating body OP moves in the proximity of the non-contacting interface 210. For example, the information of the movement may include at least one of a direction and a distance in and over which the operating body OP moves in the proximity of the non-contacting interface 210. That the operating body OP moves in the proximity of the non-contacting interface 210 signifies that, for example, the operating body OP moves in a direction parallel to the non-contacting interface 210 while keeping a state in which it is positioned in the proximity of the non-contacting interface 210.

Further, the detection section 110 may have a function of detecting a contacting operation by the operating body OP against, for example, the face of the non-contacting interface 210. The contacting operation by the operating body OP may be, for example, a touch drag operation. Information of the movement of the operating body OP in the case where a touch drag operation of the operating body OP is carried out may more particularly be information from which it can be grasped that the operating body OP moves while it keeps contact thereof with the face of the non-contacting interface 210. For example, the information of the movement may include at least one of a direction and a distance in and over which the operating body OP moves in contact with the non-contacting interface 210.

The contacting operation by the operating body OP may otherwise be an operation of contacting the operating body OP with the face of the non-contacting interface 210 (such operation may be hereinafter referred to as "touch operation").

The control section 120 has a function of carrying out changeover or changing of selection between a plurality of data objects belonging to one group based on a proximity operation by the operating body OP detected by the detection section 110. The control section 120 can select data after the changeover. The grouped data are images in the description given with reference to FIGS. 1 and 2, but are tunes in the description given with reference to FIG. 3. However, the data to be grouped are not limited to them, but may be content data such as, videos or audios or may otherwise be programs.

The control section 120 can change over the image of the display target in the same group if the proximity operation by the operating body OP detected by the detection section 110 is a proximity drag operation. On the other hand, if the proximity operation by the operating body OP detected by the detection section 110 is a proximity drag operation as described hereinabove with reference to FIG. 3, the tune of the selection target can be changed over in the same group.

Further, the control section 120 may have a function of carrying out changeover between data belonging to different ones of a plurality of groups based on a contact operation by the operating body OP detected by the detection section 110.

The control section 120 can carry out changeover of the image of the display target between different groups if the contact operation by the operating body OP detected by the detection section 110 is a touch drag operation as described hereinabove, for example, with reference to FIG. 1. On the other hand, if the contact operation by the operating body OP detected by the detection section 110 is a touch drag operation as described hereinabove, for example, with reference to FIG. 1, then the tune of the selection target can be changed over between different groups.

The control section 120 may decide whether the operation by the operating body OP detected by the detection section 110 is a contact operation or a proximity operation. For example, if the detection section 110 can detect a predetermined parameter which varies in response to the distance between the face of the non-contacting interface 210 and the operating body OP, then the control section 120 can decide based on the parameter whether the operation by the operating body OP is a contact operation or a proximity operation.

For example, the control section 120 may decide a relationship in magnitude between a variation amount of the predetermined parameter detected by the detection section 110 with reference to the predetermined parameter in the case where the operating body OP is not in the proximity of the detection section 110 and a threshold value for proximity operation detection. For example, in the case where the variation amount of the predetermined parameter is higher than the threshold value for proximity operation detection, the control section 120 may decide that the operation by the operating body OP detected by the detection section 110 is a proximity operation. On the other hand, for example, if the variation amount of the predetermined parameter is higher than a threshold value for contact operation detection, then the control section 120 may decide the operation by the operating body OP detected by the detection section 110 is a contact operation. That is, a calculating unit may calculate a distance between the face of the non-contacting interface 210 and the operating body OP, and determine based on the calculated distance whether the operating body OP is within a contact region signifying a contact operation, or within a proximity region signifying a proximity operation. The contact region may be a region between the display face of the non-contacting interface and the proximity region. Accordingly, since it is supposed that, even if the operating body OP is not strictly in contact with the non-contacting interface 210, it may be decided that the operation by the operating body OP detected by the detection section 110 is a contact operation, the "contact" may be considered a concept including also a state that the proximity degree of the operating body OP with respect to the non-contacting interface 210 is high.

The control section 120 decides the direction of the proximity operation by the operating body OP detected by the detection section 110 and may omit, i.e. prohibit, the changeover of a selection if it decides that the direction of the proximity operation is an oblique angle with respect to the face of the non-contacting interface. This is because, in the case where the direction of the proximity operation is an oblique direction, the possibility that the proximity operation may not be carried out intentionally by the user is high. Here, the direction of the proximity operation signifies a direction in which the operating body OP moves while it is in the proximity of the non-contacting interface 210.

For example, the reference for the decision that the direction of a proximity operation is an oblique direction can be determined as a changeover direction between a plurality of data. In this instance, the control section 120 may decide that the direction of the proximity operation is an oblique direction in the case where the angle defined by the direction of the proximity operation and the changeover direction exceeds a predetermined angle. The changeover direction is the leftward and rightward direction in the example described hereinabove with reference to FIG. 2 but is the upward and downward direction in the example described hereinabove with reference to FIG. 3.

The control section 120 may retain a coordinate designated in the immediately preceding cycle by a proximity operation as an immediately preceding coordinate. If a proximity operation by the operating body OP is detected by the detection section 110, then the control section 120 may decide whether or not a proximity drag operation is carried out based on the difference between the immediately preceding coordinate (i.e., a first coordinate) and a coordinate currently designated by the proximity operation (i.e., a second coordinate). More particularly, if the difference between the immediately preceding coordinate and the new coordinate is higher than a predetermined threshold value, the control section 120 may decide that a proximity drag operation is carried out. This is because, if the difference between the immediately preceding coordinate and the new coordinate is not greater than the predetermined threshold value, then the possibility that the proximity drag operation may not be carried out intentionally by the user is high, and the changing of selection is therefore prohibited. If the difference between the immediately preceding coordinate and the new coordinate is equal to the threshold value, then the control section 120 may make either decision.

The control section 120 may carry out changeover between a plurality of data, for example, if it is decided that a proximity drag operation is carried out. On the other hand, if the control section 120 decides, for example, that a proximity drag operation is not carried out, then the control section 120 may omit the changeover between a plurality of data. The control section 120 may otherwise use an average value of coordinates designated in preceding cycles in place of the immediately preceding coordinate.

The information processing apparatus 100 may further includes a processing section 130. The processing section 130 has a function of executing a predetermined process corresponding to a selected data object after changeover to the selected data object by the control section 120. In other words, the information processing apparatus 100 has a function of executing the predetermined process for data selected by the control section 120. Although the predetermined process is not restricted particularly, in the example described hereinabove with reference to FIG. 3, it may be a process for reproducing a tune selected by the control section 120 or a process for causing information relating to the tune selected by the control section 120 to be displayed. Further, the predetermined process may be a process for executing a program selected by the control section 120.

The information processing apparatus 100 may further includes a display section 140. The display section 140 is configured, for example, from a display device. The display section 140, via a display generator, can display data selected by the control section 120 or data determined as a display target. Such data may be displayed when the presence of an operating body OP is detected. Further, the display section 140 is used to display various kinds of information at a stage at which a predetermined process is executed by the processing section 130, such as changing display of data objects according to a selection.

For example, it may be supposed that the processing section 130 executes a process for causing data after changeover by the control section 120 to be displayed on the display section 140 as the predetermined process. For example, in the case where the data after changeover by the control section 120 are the image M32 as described hereinabove with reference to FIG. 2, the processing section 130 may execute a process for causing the image M32 to be displayed as the predetermined process.

Further, the display section 140 may display a plurality of data belonging to one group. For example, "Tune D1" to "Tune D10" which are a plurality of data belonging to the "Album A2" which is an example of one group are displayed as described hereinabove with reference to FIG. 3. In such an instance as just described, the processing section 130 may execute a process for causing the display section 140 to display the focus F at the position at which the data after the changeover by the control section 120 is displayed as the predetermined process. For example, as described hereinabove with reference to FIG. 3, the processing section 130 may execute a process for causing the display section 140 to display the focus F at the position at which the "Tune D5"

which is the data after the changeover by the control section 120 is displayed as the predetermined process.

The information processing apparatus 100 may further include a storage section 150. The storage section 150 is configured from a tangibly embodied non-transitory computer-readable storage device, such as a magnetic disk, or other nonvolatile memory. The storage section 150 has a function of storing a program or instructions for implementing the control section 120, processing section 130 and so forth and a function of storing various data to be used when the program is executed by a processor, such as a CPU (Central Processing Unit). In the example described above, the storage section 150 can store the threshold value for proximity operation detection, the threshold value for contact operation detection, the predetermined angle, the predetermined threshold value and so forth.

The control section 120, processing section 130 and so forth are configured from, for example, a CPU, a RAM (Random Access Memory) and so forth. The functions of the control section 120, processing section 130 and so forth are implemented by the CPU developing the program stored in the storage section 150 into the RAM and executing the program. However, the configuration of the control section 120, processing section 130 and so forth is not limited to this, but some of them may be configured from hardware for exclusive use.

1-5. Hardware Configuration of the Information Processing Apparatus

Figure 5:
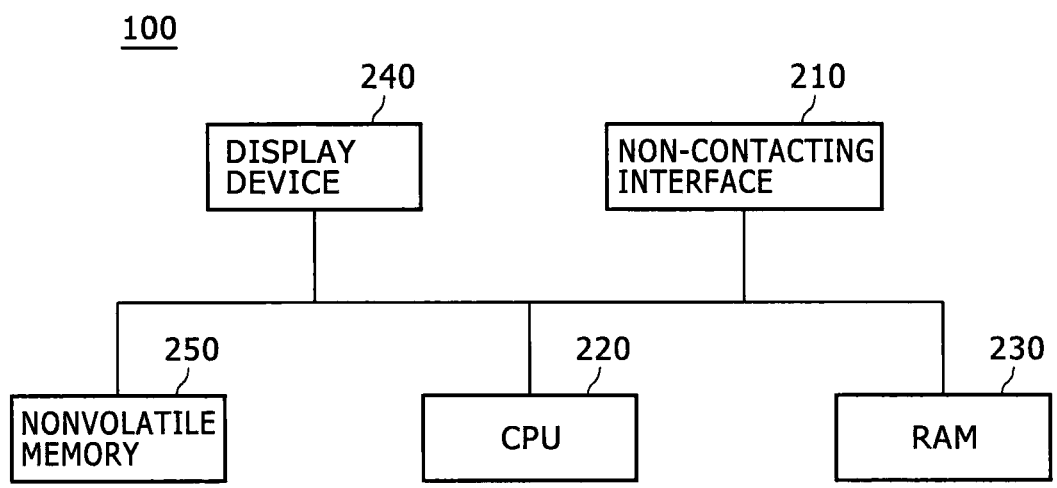
FIG. 5 is a block diagram showing a hardware configuration of the information processing apparatus.

FIG. 5 shows a hardware configuration of the information processing apparatus of the present embodiment. Referring to FIG. 5, the information processing apparatus 100 shown includes a non-contacting interface 210, a CPU 220, a RAM 230, a display device 240, and a nonvolatile memory 250.

The non-contacting interface 210 has a function of detecting a movement of the operating body OP in a non-contacting or contacting condition. By the function, for example, the non-contacting interface 210 can detect various operations by the operating body OP. If the non-contacting interface 210 can detect a predetermined parameter which varies, for example, in response to the distance between the non-contacting interface 210 and the operating body OP, then the detected parameter can be used to decide whether the operation by the operating body OP is a contact operation or a proximity operation.

The non-contacting interface 210 may be configured, for example, from an electrostatic touch panel. The electrostatic panel can detect a variation of the capacitance as the predetermined parameter which varies in response to the distance between the non-contacting interface 210 and the operating body OP. Or, the non-contacting interface 210 may be configured, for example, from an optical touch panel. The optical touch panel can detect a variation of the intensity of incident light as the predetermined parameter which varies in response to the distance between the face of the non-contacting interface 210 and the operating body OP.

Further, the non-contacting interface 210 may be configured, for example, from a USB (Universal Serial Bus) camera. In the case where a USB camera is used as the non-contacting interface 210, the predetermined parameter to be used for decision of, for example, whether the operation by the operating body OP is a contact operation or a proximity operation may be detected by a device separate from the non-contacting interface 210.

The CPU 220 functions as an arithmetic processing unit and a control apparatus and controls overall or partial operation in the information processing apparatus 100 in accordance with programs recorded in the nonvolatile memory 250 and/or the RAM 230.

The RAM 230 stores programs to be used by the CPU 220, parameters which vary suitably in execution of the programs and so forth.

The display device 240 is configured from an apparatus which can visually notify the user of information such as, an LCD (Liquid Crystal Display) apparatus or an organic EL (Electroluminescence) display device. The display device 240 outputs, for example, a result obtained by various processes carried out by the information processing apparatus 100. In particular, the display device 240 displays a result obtained by various processes carried out by the information processing apparatus 100 in the form of a text or an image. The display device 240 may be provided in the information processing apparatus 100 or may be provided externally of the information processing apparatus 100.

The nonvolatile memory 250 is an apparatus for data storage and is configured from a magnetic tangibly embodied non-transitory computer-readable storage device such as, a hard disk drive (HDD), a semiconductor storage device, an optical storage device, a magneto-optical storage device or the like. The nonvolatile memory 250 stores programs to be executed by the CPU 220 and various data.

An example of the hardware configuration which can implement the functions of the information processing apparatus 100 according to the present embodiment is described above. The components described above may be configured using a member for universal use or may be configured from hardware specified for the functions of the individual components. Accordingly, the hardware configuration to be utilized can be changed suitably in accordance with a current technical level in carrying out the embodiment.

1-6. Flow of Processing Executed by the Information Processing Apparatus

Figure 6:
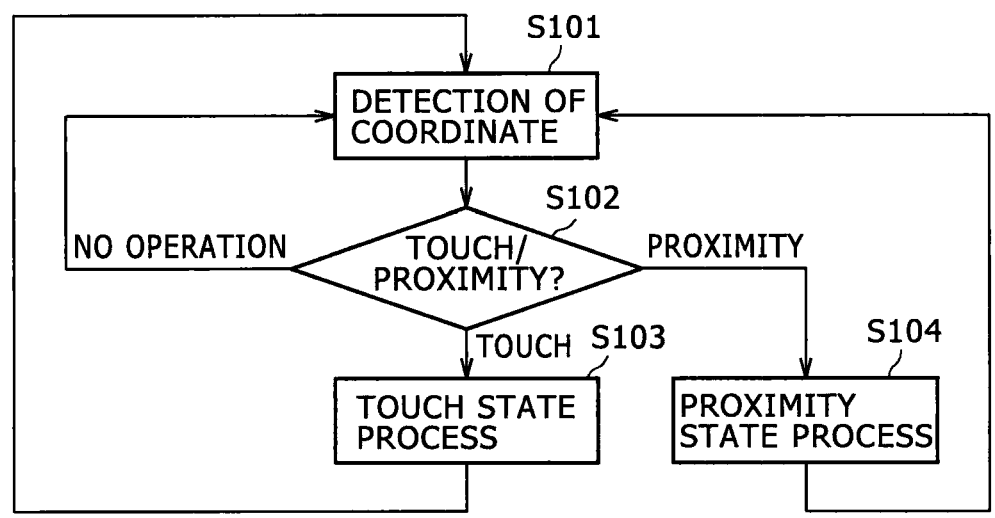
FIG. 6 is a flow chart illustrating a flow of general processing executed by the information processing apparatus.

FIG. 6 illustrates a flow of general processing executed by the information processing apparatus according to the present embodiment. Referring to FIG. 6, the detection section 110 of the information processing apparatus 100 detects a coordinate designated by the operating body OP at step S101. The control section 120 decides based on the coordinate detected by the detection section 110 whether the operation by the operating body OP is a touch operation, a proximity operation or any other than a touch operation and a proximity operation at step S102.

If the control section 120 decides at step S102 that the operation by the operating body OP is a touch operation ("touch" at step S102), then it executes a touch state process at step S103, whereafter the processing returns to step S101. On the other hand, if the control section 120 decides at step S102 that the operation by the operating body OP is a proximity operation ("proximity" at step S102), then it executes a proximity state process at step S104, whereafter the processing returns to step S101. If the control section 120 decides at step S102 that the operation by the operating body OP is any other than a touch operation and a proximity operation ("no operation" at step S102), then the processing returns to step S101.

1-7. Flow of Processing Executed when a Touching Operation is Carried Out

Figure 7:
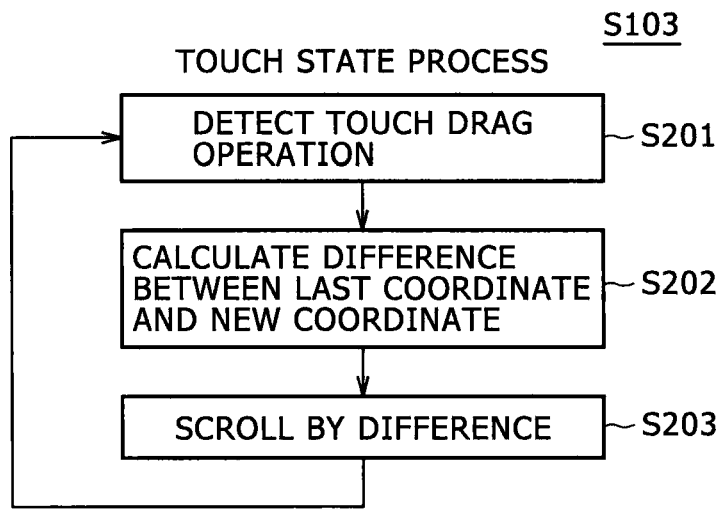
FIG. 7 is a flow chart illustrating a flow of processing executed by the information processing apparatus when a touch operation is carried out.

FIG. 7 illustrates a flow of processing executed by the information processing apparatus according to the present embodiment when a touch operation is carried out. It is to be noted that the processing executed when a touch operation is carried out corresponds to the touch state process at step S103 illustrated in FIG. 6.

Referring to FIG. 7, if the detection section 110 detects a touch drag operation which is an operation of moving the operating body OP with respect to the non-contacting interface 210 while the operating body OP is in touch with the non-contacting interface 210 at step S201, then the control section 120 calculates the difference between the immediately preceding coordinate which is a coordinate designated in the immediately preceding cycle by a contact operation and the new coordinate which is a coordinate currently designated by the contact operation at step S202. Then, the control section 120 changes over the data of the selection target, and the processing section 130 scrolls the data after the changeover by an amount equal to the calculated difference between the groups at step S203, whereafter the processing returns to step S201.

1-8. Flow of Processing Executed when a Proximity Operation is Carried Out

Figure 8:
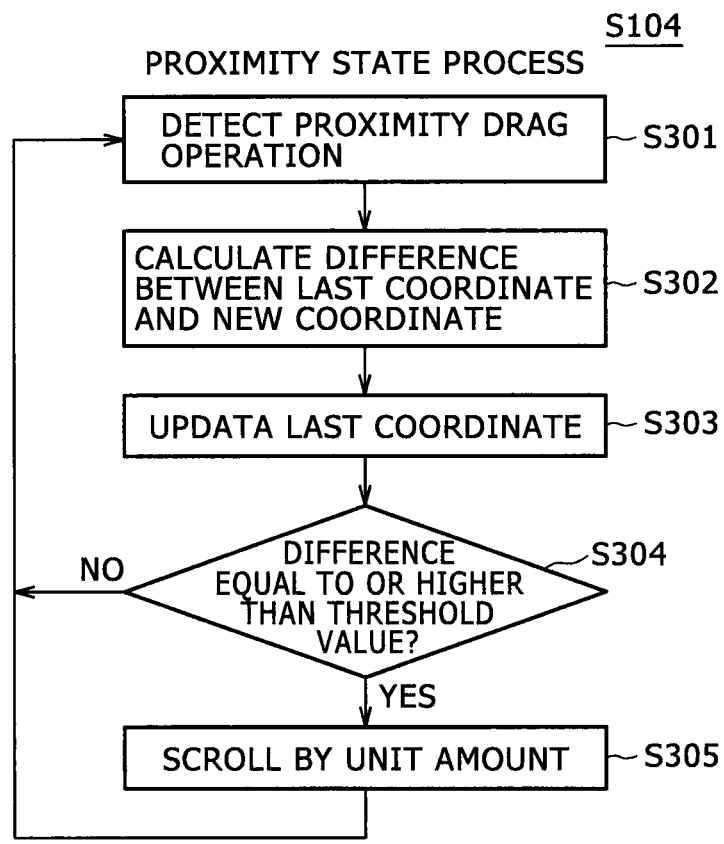
FIG. 8 is a flow chart illustrating a flow of processing executed by the information processing apparatus when a proximity operation is carried out.

FIG. 8 illustrates a flow of processing executed by the information processing apparatus according to the present embodiment when a proximity operation is carried out. It is to be noted that the processing executed when a proximity operation is carried out corresponds to the touch state process at step S104 illustrated in FIG. 6.

Referring to FIG. 8, if the detection section 110 detects a proximity drag operation which is an operation of moving the operating body OP with respect to the non-contacting interface 210 in a state in which the operating body OP is positioned in the proximity of the non-contacting interface 210 at step S301, then the control section 120 calculates the difference between the immediately preceding coordinate designated in the immediately preceding cycle by a proximity operation and the new coordinate currently designated by the contact operation at step S302. Then, the control section 120 updates the immediately preceding coordinate retained therein with the new coordinate at step S303 and decides whether or not the calculated difference is equal to or higher than a predetermined threshold value at step S304.

If the control section 120 decides at step S304 that the calculated difference is equal to or higher than the predetermined threshold value ("Yes" at step S304), then it changes over the data of the selection target, and the processing section 130 scrolls the data after the changeover by a unit amount at step S305. Thereafter, the processing returns to step S301. On the other hand, if the control section 120 decides at step S304 that the calculated difference is not equal to or higher than the predetermined threshold value ("No" at step S304), then the processing returns to step S301.

2. Modifications

While an embodiment of the present disclosure has been described above with reference to the accompanying drawings, the present disclosure is not limited to the embodiment. It is apparent that a person skilled in the art could have made various alterations or modifications without departing from the spirit and scope of the disclosure as defined in claims, and it is understood that also such alterations and modifications naturally fall within the technical scope of the present disclosure.

The information processing apparatus 100 according to the present embodiment described above carries out changeover of data within a group in response to a proximity operation and carries out changeover of data between different groups in response to a proximity operation. Also it is possible to configure a music reproduction apparatus or a moving picture reproduction apparatus which includes a non-contacting interface such that, when a contact operation is detected, fast feeding of increasing the reproduction speed or rewiring of increasing the rewinding speed is carried out, but when a proximity operation is detected, double speed reproduction or reduction by a speed of 0.5 times is carried out.

Further, if it is interpreted that a touch operation is a space-continuous operation and a proximity operation is a time-continuous operation, then the information processing apparatus 100 can be applied also to such an example as described just below. In particular, the information processing apparatus 100 according to the present embodiment can scroll, if a contact operation is detected upon zoom display of successively shot photographs of a photograph viewer, the photographs to change the display position, but carry out, if a proximity operation is detected, changeover to display of another photograph preceding or succeeding in time at the same position.

3. Summary

According to the present embodiment, an operation for changing over the mode between the mode in which the selection target is changed over between different groups and the mode in which the selection target is changed over within a group can be implement simply, readily and intuitively. In short, according to the present embodiment, changeover between changeover of data between groups and changeover of data within a group is implemented seamlessly.

According to a general touch panel, since only a state in which an operating body touches can be detected, also the screen image changes based on a single mode and also what can be operated are limited. According to the present embodiment, by newly providing significance to tracing of the sky in a proximity state, the drawback that an operation must be carried out after the mode is changed over is eliminated. In particular, according to the embodiment, changeover of the mode can be implemented simply by operating an operating body without contacting the same with the touch panel. Further, according to the embodiment, there is an advantage that the significance of an operation of operating the operating body with certainty to touch with the touch panel and another operation of operating the operating body simply in a proximity state can be recognized readily and intuitively, and although a new operation system is involved, it can be accepted readily by the public.

The present disclosure contains subject matter related to that disclosed in Japanese Priority Patent Application JP 2010-200151 filed in the Japan Patent Office on Sep. 7, 2010, the entire content of which is hereby incorporated by reference.

What is claimed is:

1. An apparatus, comprising:
one or more processors configured to:
detect a location of an operating member in a non-contacting proximity to a non-contacting interface; and
change a selection among a plurality of data objects belonging to a group among a plurality of groups, based on a change in the detected location of the operating member while the operating member is kept in the non-contacting proximity to the non-contacting interface, each of the plurality of data objects representing a different content item,
wherein the one or more processors are further configured to change a selection among the plurality of groups, based on a change in the detected location of the operating member while the operating member is kept in contact with the non-contacting interface,
wherein the change in the selection among the plurality of groups is based on a determined order.

2. The apparatus of claim 1 further comprising, a display device configured to perform both display functions and functions of the non-contacting interface.

3. The apparatus of claim 2, wherein the one or more processors are further configured to:
calculate a distance between the operating member and the non-contacting interface; and
detect a parameter for determination of an operational aspect based on the distance, wherein the parameter varies in response to the distance,
wherein the operational aspect comprises a determination of whether an operation of the operating member is a contact operation or a proximity operation.

4. The apparatus of claim 3, wherein the one or more processors are further configured to determine whether the calculated distance indicates that the operating member is within a proximity region, the proximity region being a region that is a determined distance from the display device.

5. The apparatus of claim 4, wherein the one or more processors are further configured to change the selection among the plurality of data objects, in an event the operating member is within the proximity region.

6. The apparatus of claim 4, wherein the one or more processors are further configured to determine whether the calculated distance indicates that the operating member is within a contact region, the contact region being a region between a display face of the display device and the proximity region.

7. The apparatus of claim 6, wherein the one or more processors are further configured to change a selection among a plurality of groups of data objects, in an event the operating member is within the contact region.

8. The apparatus of claim 6, wherein the one or more processors are further configured to:
change a selection among a plurality of groups of data objects, in an event the operating member is placed in contact with the display face of the display device; and
detect a movement of the operating member according to a change in the detected location of the operating member while the operating member maintains contact with the display face.

9. The apparatus of claim 2, wherein the one or more processors are further configured to detect at least one of a direction of movement or a distance of movement of the operating member.

10. The apparatus of claim 9, wherein the one or more processors are further configured to prohibit changing of selections, in an event, the direction of movement of the operating member at an oblique angle with respect to a display face of the display device is detected.

11. The apparatus of claim 1, wherein the one or more processors are further configured to:
detect a first coordinate for the operating member; and
detect a second coordinate for the operating member after a change in the location of the operating member is detected.

12. The apparatus of claim 11, wherein the one or more processors are further configured to prohibit changing of a selection, in an event a difference between the first coordinate and the second coordinate is not greater than a threshold.

13. The apparatus of claim 1, wherein the one or more processors are further configured to execute a determined process corresponding to a selected data object.

14. The apparatus of claim 1 further comprising, a display device configured to display the plurality of data objects according to a changed selection.

15. The apparatus of claim 1 further comprising, a display generator device configured to change a display of a selected data object to highlight the selected data object.

16. The apparatus of claim 1, wherein each of the plurality of groups includes a plurality of images and the one or more processors are further configured to:
change a selection of a target image of the plurality of images within the group while the operating member is moved in the non-contacting proximity to the non-contacting interface; and
change a selection of the target image among the plurality of groups while the operating member is moved in contact with the non-contacting interface.

17. The apparatus of claim 1, wherein one or more characters corresponding to a selected data object among the plurality of data objects is superimposed on a displayed plurality of data objects.

18. A method comprising:
detecting, by a processor, a location of an operating member in a non-contacting proximity to a non-contacting interface, wherein the detecting comprises calculating a distance between the operating member and the non-contacting interface;
changing, by the processor, a selection among a plurality of data objects belonging to a group among a plurality of groups, based on a change in the detected location of the operating member while the operating member is kept in the non-contacting proximity to the non-contacting interface; and
changing, by the processor, a selection among the plurality of groups, based on a change in the detected location of the operating member while the operating member is kept in contact with the non-contacting interface,
wherein the change in the selection among the plurality of groups is based on a determined order.

19. A non-transitory computer-readable storage device having stored thereon, a set of computer-executable instructions for causing a computer to perform operations comprising:
detecting a location of an operating member in a non-contacting proximity to a non-contacting interface, wherein the detecting comprises calculating a distance between the operating member and the non-contacting interface;
changing a selection among a plurality of data objects belonging to a group among a plurality of groups, based on a change in the detected location of the operating member while the operating member is kept in the non-contacting proximity to the non-contacting interface; and
changing a selection among the plurality of groups, based on a change in the detected location of the operating member while the operating member is kept in contact with the non-contacting interface,
wherein the change in the selection among the plurality of groups is based on a determined order.

* * * * *